(12) United States Patent
Clark et al.

(10) Patent No.: US 10,873,626 B2
(45) Date of Patent: Dec. 22, 2020

(54) TARGET DRIVEN PEER-ZONING SYNCHRONIZATION

(71) Applicant: HEWLETT PACKARD ENTERPRISE DEVELOPMENT LP, Houston, TX (US)

(72) Inventors: Alice Terumi Clark, Littleton, MA (US); Rupin T. Mohan, Littleton, MA (US); Vivek Agarwal, Littleton, MA (US); Krishna Puttagunta, Roseville, CA (US); Christopher Robert Nichols, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 252 days.

(21) Appl. No.: 15/767,316

(22) PCT Filed: Apr. 29, 2016

(86) PCT No.: PCT/US2016/029990
§ 371 (c)(1),
(2) Date: Apr. 10, 2018

(87) PCT Pub. No.: WO2017/188972
PCT Pub. Date: Nov. 2, 2017

(65) Prior Publication Data
US 2020/0169604 A1    May 28, 2020

(51) Int. Cl.
*G06F 15/16* (2006.01)
*G06F 15/173* (2006.01)
(Continued)

(52) U.S. Cl.
CPC ........ *H04L 67/1095* (2013.01); *G06F 16/219* (2019.01); *H04L 49/356* (2013.01); *H04L 67/1097* (2013.01)

(58) Field of Classification Search
CPC .... G06F 17/30365; H04L 49/25; H04L 45/02
(Continued)

(56) References Cited

U.S. PATENT DOCUMENTS 6,597,656 B1    7/2003    Blanc et al.
7,904,599 B1    3/2011    Bennett
(Continued)

FOREIGN PATENT DOCUMENTS

CN    101933014 A    12/2010
CN    103092657 A    5/2013
(Continued)

OTHER PUBLICATIONS

"Principal/Peer Zoning in FC-GS-7"—Ralph O. Weber, ENDL Texas, Jul. 27, 2011 (Year: 2011).*
(Continued)

*Primary Examiner* — Randy A Scott
(74) *Attorney, Agent, or Firm* — Hewlett Packard Enterprise Patent Department

(57) ABSTRACT

A system and method for target driven peer-zoning (TDPZ) synchronization can include a principal member device and a switch. The principal member device can include to send an active peer zone list request to a switch. In an example, the principal member device can store a first TDPZ database version number and a first TDPZ zone list. In an example, the switch may send a response based on the active peer zone list request. In an example, the response can include a second TDPZ database version number and a second TDPZ zone list. The principal member device may compare the first TDPZ database version number to the second TDPZ database version number.

16 Claims, 9 Drawing Sheets

(51) Int. Cl.
  *H04L 29/06* (2006.01)
  *H04L 29/08* (2006.01)
  *G06F 16/21* (2019.01)
  *H04L 12/931* (2013.01)
(58) Field of Classification Search
  USPC .................. 709/217, 220, 227, 228, 238
  See application file for complete search history.

(56) References Cited

U.S. PATENT DOCUMENTS

| | | | |
|---|---|---|---|
| 7,934,018 B1* | 4/2011 | Lavallee | H04L 67/1097 709/248 |
| 7,958,282 B2 | 6/2011 | Odenwald, Jr. et al. | |
| 7,990,994 B1 | 8/2011 | Yeh et al. | |
| 7,996,509 B2 | 8/2011 | Basham et al. | |
| 8,599,864 B2 | 12/2013 | Chung et al. | |
| 8,806,150 B2 | 8/2014 | Nakajima | |
| 8,930,537 B2 | 1/2015 | Basham et al. | |
| 9,009,311 B2* | 4/2015 | Myrah | H04L 63/104 709/224 |
| 2003/0131051 A1 | 7/2003 | Lection et al. | |
| 2005/0025075 A1* | 2/2005 | Dutt | H04L 12/4641 370/299 |
| 2009/0168772 A1 | 7/2009 | Dropps et al. | |
| 2009/0222733 A1 | 9/2009 | Basham et al. | |
| 2010/0077408 A1 | 3/2010 | Forte et al. | |
| 2012/0254554 A1 | 10/2012 | Nakajima | |
| 2013/0262811 A1 | 10/2013 | Taguchi | |
| 2013/0332614 A1 | 12/2013 | Brunk et al. | |
| 2014/0115087 A1* | 4/2014 | Nakajima | G06F 3/067 709/212 |
| 2014/0372721 A1 | 12/2014 | Nakajima | |
| 2016/0087841 A1 | 3/2016 | Bharadwaj et al. | |
| 2019/0020603 A1* | 1/2019 | Subramani | H04L 12/28 |

FOREIGN PATENT DOCUMENTS

| | | |
|---|---|---|
| CN | 105321108 A | 2/2016 |
| CN | 105404701 A | 3/2016 |
| WO | WO-2017023271 A1 | 2/2017 |

OTHER PUBLICATIONS

Datacore Software, "Host Configuration Guide," (Research Paper), VMware ESXi, SANsymphony-V, Jun. 2015. 40 pages, http://datacore.custhelp.com/ci/fattach/get/251472/1433931452/redirect/1/session/L2F2LzEvdGltZS8xNDM0Njk4MzA5L3NpZC9TemhpM2dwbQ==/filename/Host_Configuration_Guide_VMware.pdf.

EMC 2, "EMC Powerpath Load Balancing and Failover," White Paper, Feb. 2011, 28 pages, http://www.emc.com/collateral/scftware/white-papers/h8180-powerpath-load-balancing-failover-wp.pdf.

International Search Report & Written Opinion received in PCT Application No. PCT/US2015/043245, dated May 30, 2016, 13 pages.

International Search Report & Written Opinion received in PCT Application No. PCT/US2016/029990, dated Jan. 26, 2017, 10 pages.

Netapp, Inc., "Clustered Data ONTAP® 8.2," Network Management Guide, May 8, 2013, 109 pages, https://library.netapp.com/ecm/ecm_download_file/ECMP1196907.

Poulton, N., "Anyone for Target Driven Zoning," May 9, 2013, 4 pages, http://blog.nigelpoulton.com/anyone-for-target-driven-zoning/.

Smith, E., "Introducing Target Driven Zoning (TDZ)," Jan. 16. 2012, 10 pages, http://brasstacksblog.typepad.com/brass-tacks/2012/01/introducing-target-driven-zoning-tdz.html.

Weber, R. O., "Principal/Peers Zoning in FC-GS-7," Jan. 3, 2011, 13 pages, http://www.t11.org/ftp/t11/pub/fc/gs-7/11-001v0.pdf.

Ralph O. Weber, "Principal/Peers Zoning in FC-GS-7", ENDL, Texas, Jan. 27, 2011, 13 pages.

Wikipedia, "Software versioning", available online at <https://en.wikipedia.org/w/index.php?title=Software_versioning&oldid=706254171>, Feb. 22, 2016, 14 pages.

Wikipedia, "Version control", available online at <https://en.wikipedia.org/w/index.php?title=Version_control&oldid=709871737>, Mar. 13, 2016, 10 pages.

Wikipedia, "Versioning file system", available online at <https://en.wikipedia.org/w/index.php?title=Versioning_file_system&oldid=694519694>, Dec. 9, 2015, 5 pages.

\* cited by examiner

100

200

500

TARGET DRIVEN PEER-ZONING SYNCHRONIZATION

BACKGROUND

Storage systems such as storage networks, storage area networks, and other storage systems, have controllers and storage disks for storing data. Client or host devices may request to access the data in the storage. A storage network, such as storage area network (SAN), may be a dedicated network that provides access to consolidated data storage. A SAN facilitates a host client device to access data volumes stored in a storage array or disk array.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
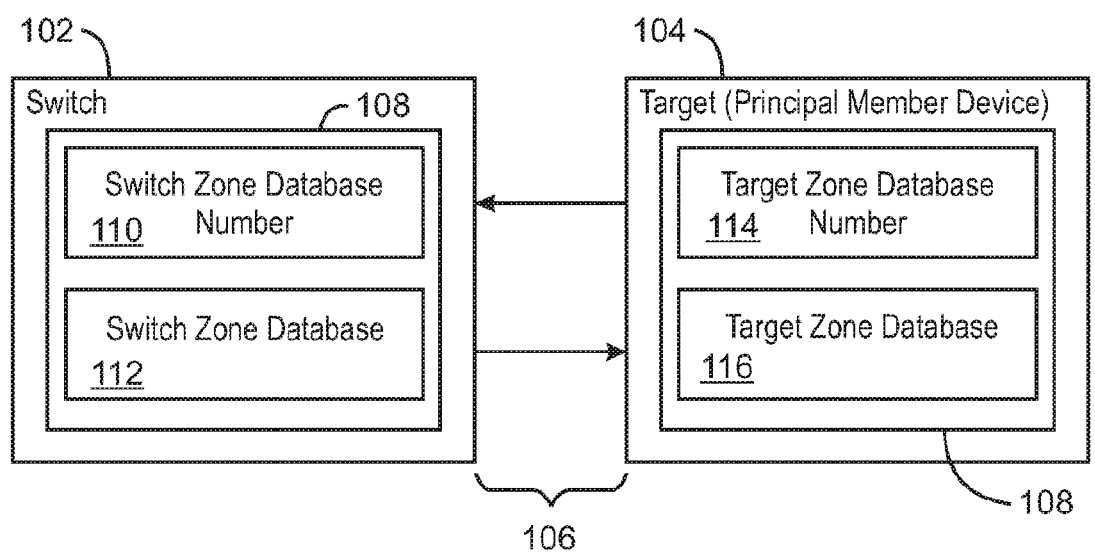
FIG. 1 is a schematic diagram of an example target driven peer zoning synchronization system.

A zoning technique for SAN can include a system of segregation of communication between initiators which can have role of peer devices, and targets, which can have the role of principal member devices. Switches can act as intermediary devices to enforce the zoning rules. With peer zones, initiators acting as peer members may not be able to communicate with each other. In this new zoning technique, principal member devices communicate with peer devices but peer devices generally cannot communicate with one another. Switches may know the state of devices, both initiators and targets. In an example, switches can be responsible for communicating state changes to the devices, which have requested state change notifications, dependent on zoning rules. Link down conditions may prevent the communication between the switch and a specific device. The communication between the switch and a specific device can be a notification of the state change of a particular device. This present disclosure outlines, in part, the device, target, system, and method for synchronization of the membership records of target created peer zones.

A SAN may play a beneficial role in a datacenter by providing access and connectivity between storage arrays and servers. The network or fabric of the SAN may include of one or more switches, where the number of switches may depend on the size of the SAN. Multiple switches can be present in a SAN fabric, and SAN dual fabrics for redundancy and high availability.

Fibre Channel (FC) is a storage protocol for SAN deployments. As part of security, zoning is a technique that can restrict access to a select set of devices in a pre-configured group known as a zone. Zoning may prevent unauthorized access by those outside of the zone membership. Presently, zoning techniques can employ techniques where a single initiator is zoned with many targets, or potentially more favorably, a single initiator is zoned with a single target, which typically resulted in a large number of zones. This manner of zoning can prove to be complex, tedious, and error-prone. To handle these issues, the Fibre Channel committee introduced a new type of zoning called peer zoning. Peer zones consist of principal members and peer members. Within a zone, principal members can communicate with peer members, while peer members cannot communicate with each other. Thus, with peer zoning, a target, acting as a principal member, can communicate with the initiators, acting as peer members. Further, with peer zoning, the initiators cannot communicate with each other, a property that can shield the initiators from unnecessary notifications when the state of a peer member changes.

In target-based peer zoning, a preference may be to have one target port in a zone. Although peer zoning, in general, permits multiple principal members, one practice employs one target port and multiple initiators in a zone, for security reasons as well as for effective utilization of switch hardware resources.

Presently, various implementations by vendors support peer zoning. The implementations have included automated target-orchestrated zoning, commonly referred to as target-driven peer zoning (TDPZ). Some switch vendors, through their command line interface (CLI) or management tools, facilitate zones to be created that have the peer zone characteristics, i.e., zones can be configured using switch management tools that maintain the characteristics of peer zones, where only the target can communicate with the initiators but the initiators cannot communicate with each other. With the capability of the TDPZ zone database being updated by potentially three sources: target, management software, and switch CLI, the target can benefit from the ability to determine the latest membership of its TDPZ zones.

In previous implementations, a target can receive a notification of any change, with the possibility of a communication break-down due to a link down condition. A breakdown of communication could ruin synchronization between target and switch. In the present disclosure, to maintain synchronization between the TDPZ databases within the switch and target, versioning can be introduced into the TDPZ databases.

Versioning can occur for the database containing the target-created peer zones in a different way than switch CLI-created peer zones. This disclosure outlines the versioning for only target-created peer zones. When changes are made to a TDPZ zone, such as creation, modification, deletion of a target-created peer zone, a communication of the peer zone update can be sent to the principal member device. In this example the target device can have the role of principal member device as described above. The communication of the peer zone update can be a peer zone Registered State Change Notification (RSCN). This RSCN communication can occur smoothly resulting in two TDPZ zone databases, e.g. target and switch TDPZ zone databases, staying in synchronization. In situations where communication can be lost between the target and switch, versioning can help maintain synchronization through tracking possible changes that were made to a database of a switch or target while the communications were down. With versioning, upon a link being re-established, a target device can verify that its record of the current TDPZ zones is accurate.

In previous examples, upon link up, a target device could query the switch as to whether the switch supports TDPZ. If the switch does, the target can then query the switch to verify the target-driven peer zones the switch has created on its behalf. A TDPZ zone membership returned by the switch would then be compared line-by-line to the zones TDPZ zones the target has in its TDPZ zone database. If any TDPZ zones were missing or not in both the switch and target TDPZ zone databases or the TDPZ zone membership differed between the two databases, the target could then update its database or initiate commands to update the switch database. In the present disclosure, to resolve a need to track and compare an entire database, a TDPZ zone database versioning method is disclosed. Upon comparison, a switch and target can avoid comparing every TDPZ zone in their TDPZ zone databases, and can instead compare TDPZ zone database versions. The higher version number can indicate a TDPZ zone database more recently up to date. The more up to date TDPZ zone database can then be adopted by the device with the lower version number to synchronize the TDPZ zone databases.

In an example, the versioning can happen per TDPZ zone as identified by the principal member's WWN. There may be multiple actual TDPZ zones per principal member's WWN. A version number may apply to the TDPZ zone grouping as defined by the principal member's WWN facilitating a comparison of version numbers can be done. In an example the comparison can be done by the target, with a switch database update initiated by the target upon detection that the target's database may be more up-to-date than the switch database.

FIG. 1 is a schematic diagram of an example target driven peer zoning synchronization system 100. The system can implement the techniques discussed herein on the hardware shown and other similar systems.

As used herein, a SAN can include of one or more switches 102, where the number of switches 102 may depend on the size of the SAN. In examples of TDPZ zoning, limited or no access may be allowed between peer members. Further, as discussed herein, a switch 102 may allow most or all peer members to communicate with a target 104. The target 104 can have the role of a principal member device for the purposes of TDPZ zoning. A target 104 may be an array having the data and a processor for processing the data. The target 104 can consist of multiple target ports, each which can be the principal member of a TDPZ zone. The target 104 can maintain the TDPZ zone membership database and associated version numbers for its target ports.

The communications 106 between the switch 102 and the target (principal member device) 104 can aid in the TDPZ zoning and versioning discussed herein. Both the switch 102 and the target 104 can include a memory resource 108 for storage of computer code. The memory resource 108 can include nonvolatile memory, and code stored in the nonvolatile memory.

For the switch 102, the memory resource 108 can also store a switch zone database number 110. The switch zone database number 110 can be a version number of a switch zone database 112. The switch zone database can be a TDPZ zoning list, stored on the switch, of TDPZ zones belonging to a specified principal member, and the members of each of those TDPZ zones.

For the target 104, the memory resource 108 can store a target zone database number 114. The target zone database number 114 can be a version number of a target zone database 116. The target zone database 116 can be a TDPZ zoning list, stored on the target, of TDPZ zones belonging to a specified principal member, and the members of each of those TDPZ zones. The TDPZ zones contained within both the switch zone database 112 and target zone database 116 can be arranged or indexed by principal member WWN. In an example, a version number can be specific to each index value, for example, each principal port WWN. In an example, if no TDPZ zone has ever been established for a principal port WWN, the database version for that WWN can be set to zero. If all TDPZ zones are deleted for a principal member WWN from a zone database, the version number for that WWN on the switch can be changed to −1 and can also be timestamped.

In an example, because the number of possible principal member WWNs can be enormous and when the switch's TDPZ database allocation limit is reached, the switch can delete the oldest principal member entry that has no TDPZ zones in order to make room for future TDPZ database allocation. As far as database synchronization, the communications between the target 104 and the switch 102 can allow comparison of switch zone database number 110 and target zone database number 114 to enforce a synchronization between the versions of the databases stored by the switch 102 and the target 104.

Figure 1A:
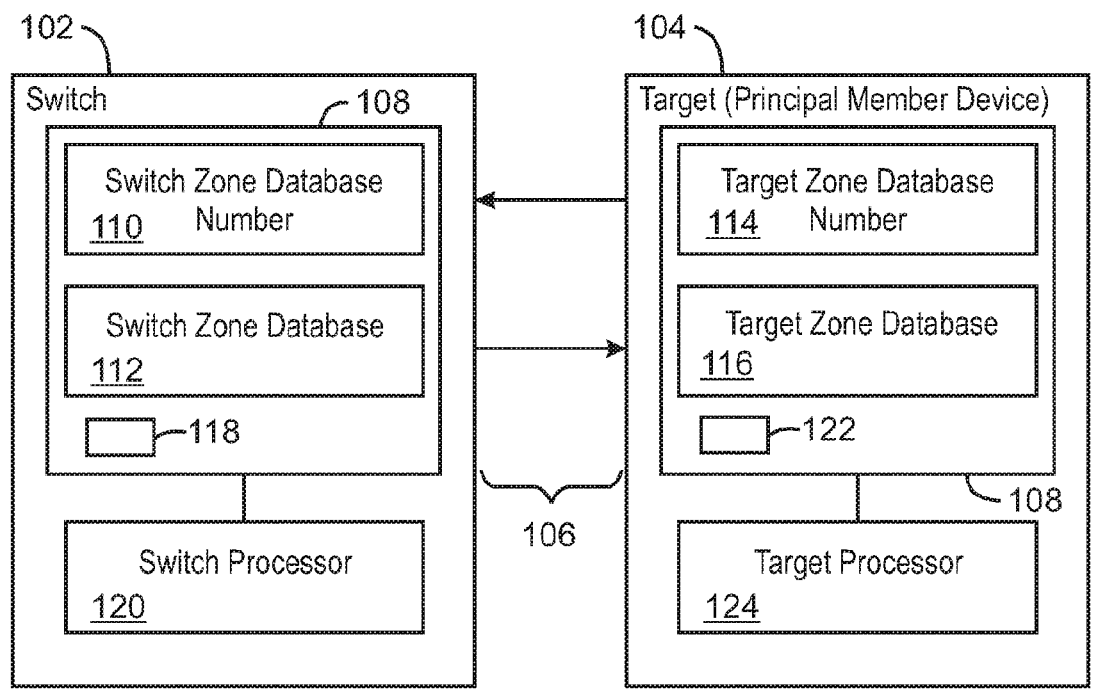

FIG. 1A is a schematic diagram of an example target driven peer zoning synchronization system 100. Like numbered items are as described in FIG. 1.

The system 100 can include a principal member device 104 including a target processor 124 and a target memory 108 storing first code 122 executable by the first processor 124. The principal member device can send an active peer zone list request to a switch 102. The principal member device 104 stores a first TDPZ database version number 114 and a first TDPZ zone database 116. The TDPZ database can be a TDPZ database list and can also be a single entry of a TDPZ zone.

The switch 102 can include a second processor 120 and a second memory 108 storing a second code 118 executable by the second processor 120. The code 118 is executed by the processor 120 such that the switch 102 sends a response to the principal member device 104 based on the active peer zone list request, the response including a second TDPZ database version number 110 and a second TDPZ zone database 112. As above, the second TDPZ zone database can include a TDPZ zone list or a single instance of a TDPZ zone. The principal member device 104 can, via the first code 112 executable by the first processor 124, compare the first TDPZ database version number 114 to the second TDPZ database version number 110.

Figure 2:
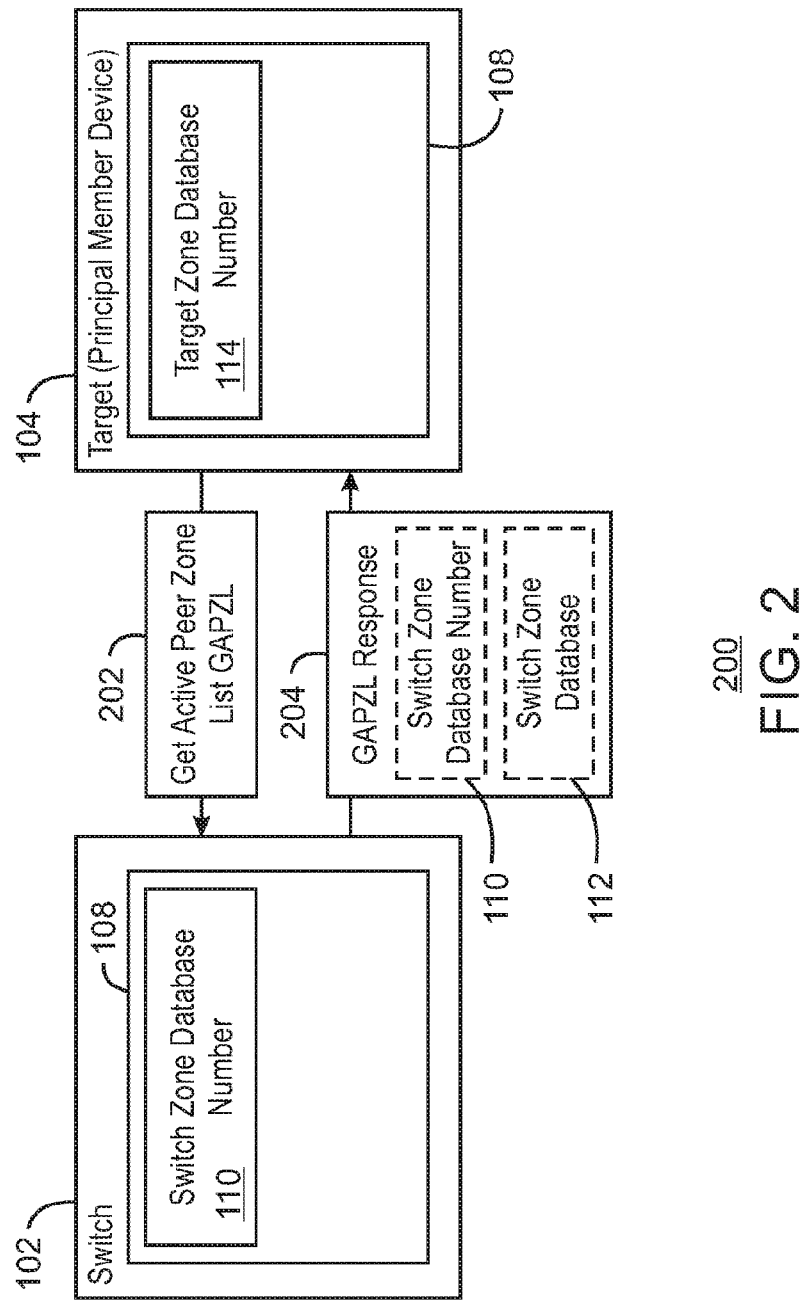
FIG. 2 is a schematic diagram of an example communications exchange during a target driven peer zoning synchronization.

FIG. 2 is a schematic diagram of an example communications exchange 200 during a target driven peer zoning synchronization. Like numbered items are as discussed in FIG. 1.

To support TDPZ database versioning and synchronization, a command and response can be exchanged between the switch 102 and the target 104. The command can be a Get Active Peer Zone List command (GAPZL) 202. The GAPZL 202 can be an in-band command, which can be issued from the target 104. The target 104 can issue the GAPZL 202 upon at least upon an initial link up condition.

The target 104 can issue the GAPZL 202 upon at least upon a Peer Zone registered state change notification (RSCN) the target 104 may receive. In an example, the GAPZL 202 can include a target's (principal member device's) port world wide name (WWN).

In response to receiving a GAPZL 202, the switch 102 can send a GAPZL response 204 will include the current switch database number 110. As discussed above, the switch zone database number 110 can be a TDPZ database version number. The GAPZL response 204 can also include the current switch zone database 112. As discussed above, the switch zone database 112 can include a list of TDPZ zones belonging to a principal member and the members of each of those TDPZ zones. In an example, the switch 102 returns only the peer zones created by the target 104 rather than all the zones, whether peer or regular, in the GAPZL response 204. Compared to previous versions of zoning that include switch CLI-created peer zones, the GAPZL response from a target does not return these CLI-created peer zones even if the principal member of those zones is the specified target's 104 WWN.

Based on the received GAPZL response 204, the target 104 can decide what actions to take. The action taken by the target 104 can vary based on the values returned in the GAPZL response 204. An example of this decision process can be seen in FIG. 3.

Figure 3:
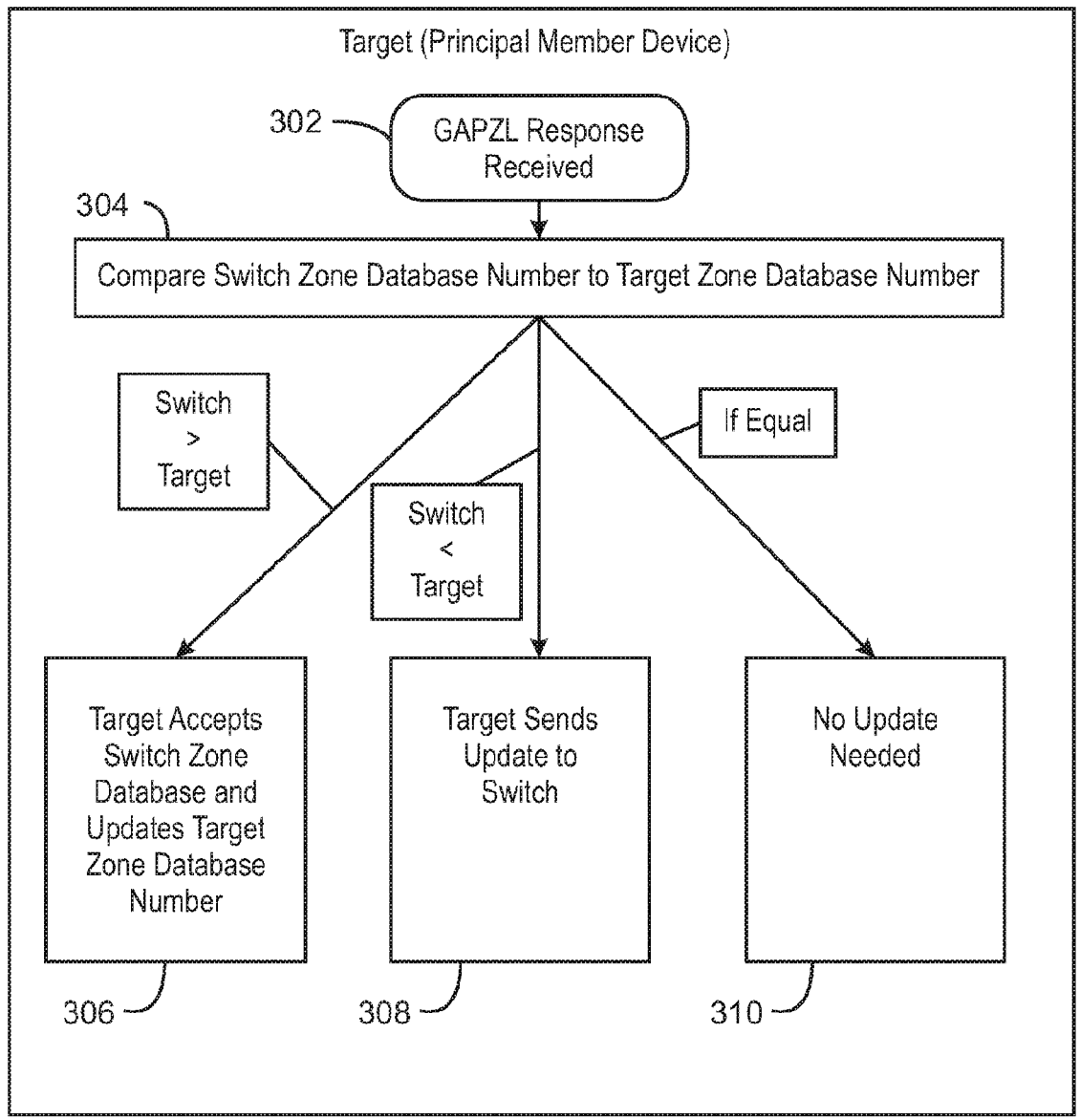
FIG. 3 is a schematic diagram of an example comparison inside a target device.

FIG. 3 is a schematic diagram of an example comparison 300 inside a target device. Like numbered items are as described in FIG. 1.

Within the target (principal member device) 104, actions can be based on an initial receipt 302 of the GAPZL response. As discussed above the GAPZL response can include the switch zone database number 110 and the switch zone database 112. Accordingly, when the GAPZL Response 204 is received 302, the target 104 can then compare the switch zone database number to the target zone database number 304. If the switch zone database number is greater than the target zone database number, the target accepts switch zone database and updates the target zone database number 306. If the target zone database number is greater than the switch zone database number, target can send an update 308 to the switch. The accepting of a switch zone database or the updating of a switch by a target can include the commands and responses discussed in FIG. 4.

When comparing 304 the switch zone database number to the target zone database number, if the two values are equal then no update to either target or switch may be needed 310. In the situation where both values are equal, the target 104 and the switch would be synchronized as far as the TDPZ databases are concerned.

Figure 4:
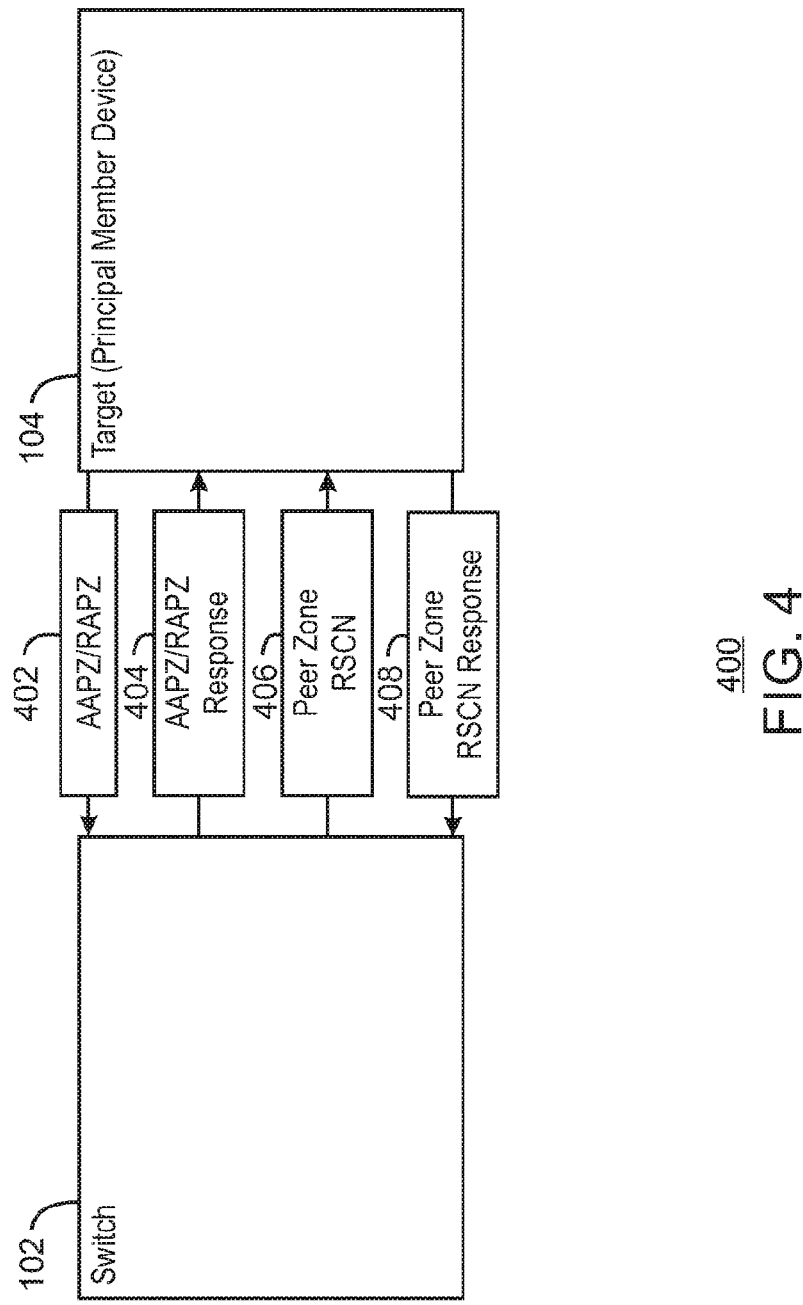
FIG. 4 is a schematic diagram of an example updating process for a database listing.

FIG. 4 is a schematic diagram of an example updating process for a database listing. Like numbered items are as described here and as in FIGS. 1 and 3.

In a first step of updating a database listing from a target 104 to a switch 102, an add/replace active peer zone command (AAPZ) or a remove active peer zone command (RAPZ) can be sent 402. An AAPZ command can direct the switch 102 to add/replace a peer zone to the switch zone database. A RAPZ command can direct the switch 102 to remove a peer zone from to the switch zone database.

An AAPZ/RAPZ 404 response can be sent in response to the AAPZ/RAPZ command 402. The response can acknowledge to the target 104 that the command was received by the switch 102.

As discussed above, if upon comparison, a target zone database version number is greater than the switch zone database version number, then the target may update the switch zone database. In an example, a method for updating a switch zone database can be through the addition or removal of peer zones from the switch zone database. The use of versioning can assist in facilitating that the addition or removal of peer zones is synchronized between a target and a switch.

After an AAPZ or RAPZ command response has been sent, the switch 102 can issue a peer zone register state change notification command (RSCN) 406 to the target 104. In an example the RSCN can be sent to all specified targets 104 in case of any major zone changes. The RSCN can allow targets to immediately gain knowledge about the zones and react through further AAPZ/RAPZ commands until the peer zone databases match the target zone database. A target 104 can issue a peer zone RSCN response 408 to the switch 102 that issued the RSCN command 406 in order to acknowledge the receipt of the peer zone RSCN command 406.

In an example, the target can increment its TDPZ zone database version when sending an AAPZ command to the switch. In an example, the target can increment its TDPZ zone database version when sending a RAPZ command to the switch. In an example, the target can increment its TDPZ zone database version when sending a Peer Zone RSCN response to the switch.

In an example, all TDPZ zones for a principal port can be deleted through manual deletion, software command from a management tool, or from CLI manipulation. In a case where all TDPZ zones for a principal port may be deleted, the switch can change its database version for the specified principal port WWN to −1. The setting of a version number for the TDPZ zone database for a particular principal port to −1 can differentiate between the deletion of previously existent peer zones for that principal port and the case where peer zones did not previously exist for the principal port. In the case where a target 104 can request a version number for a peer zone for that port, the switch 102 can return a GAPZL response with the switch zone database number of −1. A GAPZL response with the value of −1 may indicate that previous TDPZ zones for the specified principal port have all been deleted. Upon receipt of this GAPZL response from the switch 102, the target 104 may reset the version number for the specified principal port WWN to zero and clear out the target peer zone database for that particular port WWN.

In an example, the switch can increment its TDPZ zone database version when sending an AAPZ response to the target. In an example, the switch can increment its TDPZ zone database version when sending a RAPZ response to the target unless the database version went to −1. The switch can increment its TDPZ zone database version when a CLI commands deletion of a TDPZ zone. The switch can increment its TDPZ zone database version when sending a peer zone RSCN to the target unless the database version went to −1. A switch's TDPZ database version can change from −1 to 0 when an AAPZ is received for that principal port WWN.

Figure 5:
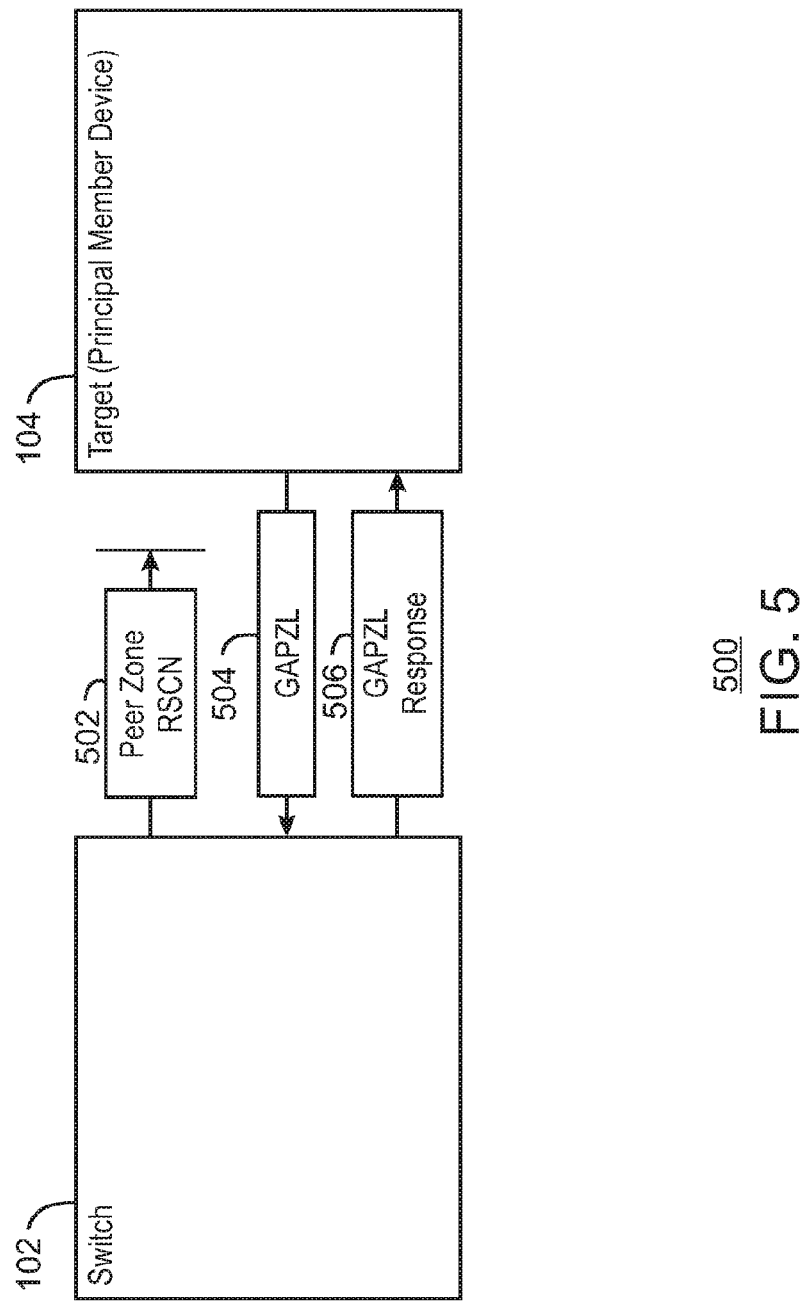
FIG. 5 is a schematic diagram of an example target driven peer zoning synchronization when a communication fails.

FIG. 5 is a schematic diagram of an example target driven peer zoning synchronization when a communication fails 500. The like numbered item is as shown in FIG. 1. In an example, a peer zone RSCN can fail 502 or not reach its destination. If during the link-down condition, there are changes made to the switch's TDPZ zone database, once the link is back up, through the GAPZL command 504 and a GAPZL response 506, the target can determine if the peer zone in the peer zone database or the target zone database have changed. Upon determining that peer zone may not have been committed, a target 104 can use the GAPZL response to properly update databases. As discussed above, a database update can include a target's TDPZ zone database sending updating commands to the switch.

Figure 6:
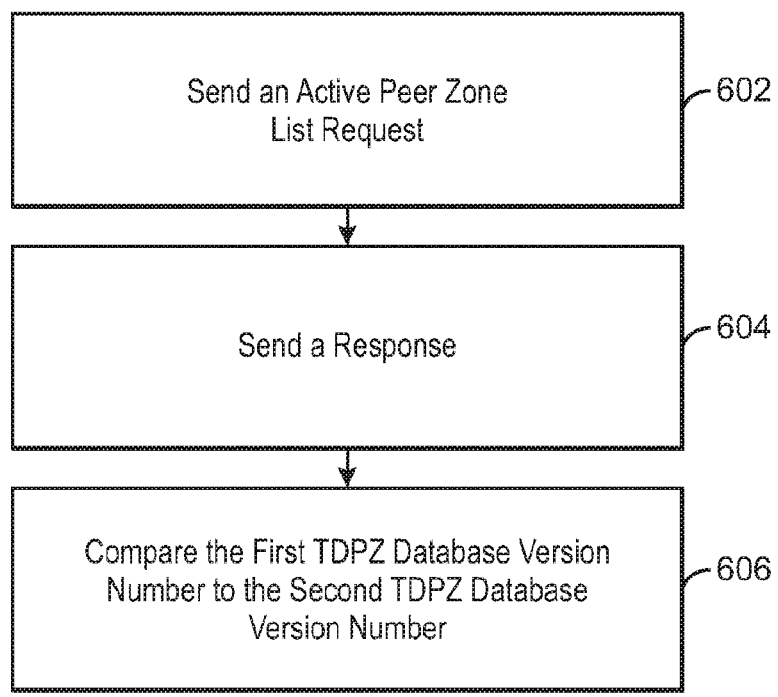
FIG. 6 is a block flow diagram of a method of an example method of target driven peer zoning synchronization.

FIG. 6 is a block flow diagram of a method 600 of an example method of target driven peer zoning synchronization. Process flow begins at block 602.

At block 602, the method 600 can include sending with a principal member device to a switch, an active peer zone list request. In an example, the principal member can store a first TDPZ database version and a first TDPZ zone list.

At block 604, the method 600 can include sending with the switch to the principal member device, a response based on the active peer zone list request. In an example, the response can include a second TDPZ database version and a second TDPZ zone list.

At block 606, the method 600 can include comparing, at the principal member device, the first TDPZ database version number to the second TDPZ database version number. If the first TDPZ database version number is less than the second TDPZ database version number, the principal member device can update the first TDPZ database version number to equal the second TDPZ database version number, and the principal member device may store the second TDPZ zone list in place of the first TDPZ zone list.

In an example, the method 600 can also include sending, with the principal member device, an active peer zone communication to the switch if the first TDPZ database version number is greater than the second TDPZ database version number. In an example, the active peer zone communication can include an active peer zone communication, and the principal member device is to increment the first TDPZ database version number. In an example, the method 600 can include sending, from the switch, an active peer zone response and incrementing, with the switch, the second TDPZ database version number.

In an example, the method 600 can include sending, from the switch, a registered state change notification (RSCN) to the principal member device; and incrementing with the switch, the second TDPZ database version number.

The method herein described can allow versioning. Versioning can work when a switch or target may be replaced. For example, if a target is new, then the target may automatically update the target zone database with the TDPZ database information from the switch and set the target zone database version number to the given switch database version. If the switch is new, the GAPZL response can have version number of zero. A GAPZL response with a version number of zero can indicate that TDPZ zones may have never existed for the switch. When a GAPZL response includes a version number of zero, a target may send appropriate AAPZ commands to update the switch. These methods and others shown here can be implemented on the systems shown and discussed in FIGS. 1-5.

The method can also include updating the first TDPZ database version number to equal the second TDPZ database version number in response to the first TDPZ database version number being less than the second TDPZ database version number. In an example, the principal member device can store the second TDPZ zone database or list in place of the first TDPZ zone list database or list.

Figure 7:
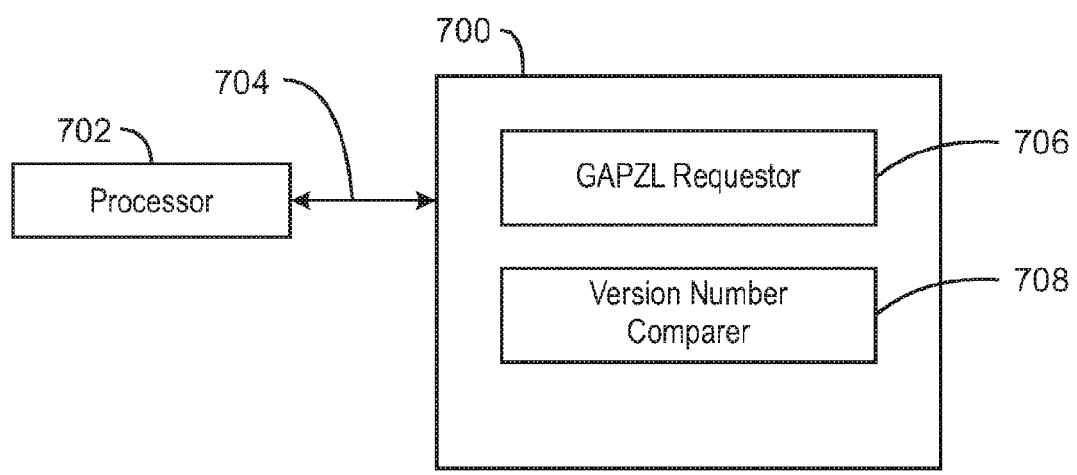
FIG. 7 is a block diagram showing a tangible, non-transitory, computer-readable medium that stores code configured to direct a processor for target driven peer zoning synchronization.

FIG. 7 is a block diagram showing a tangible, non-transitory, computer-readable medium that stores code configured to direct a processor for target driven peer zoning synchronization.

The computer-readable medium is referred to by the reference number 700. The computer-readable medium 700 can include RAM, a hard disk drive, an array of hard disk drives, an optical drive, an array of optical drives, a non-volatile memory, a flash drive, a digital versatile disk (DVD), or a compact disk (CD), among others. The computer-readable medium 700 may be accessed by a processor 702 over a computer bus 704. Furthermore, the computer-readable medium 700 may include code configured to perform the methods and techniques described herein. The computer readable medium 700 may be the memory resource 108 of FIG. 1, the nonvolatile memory discussed in regards to the memory resource 108 and other suitable mediums for storage of computer code for later execution on a processor. The computer readable medium 700 may include firmware executed by a processor or the switch and target of FIGS. 1-5.

The various software components discussed herein may be stored on the computer-readable medium 700. A portion of the computer-readable medium 700 can a GAPZL requestor 706, which may be a module or executable code that directs a processor or controller in requesting a Get Active Peer Zone List command be sent to an appropriate switch, indicator, or other suitable location for peer zoning. A portion of the computer-readable medium 700 can a version number comparer 708, which may be a module or executable code that directs a processor or controller in comparing the version numbers of peer zone database versions between a target 104 acting as a principal member device and a switch 102. As discussed above, the comparison of version numbers can be done, in part, through a response to a GAPZL request made initially through a GAPZL requestor 706.

Figure 8:
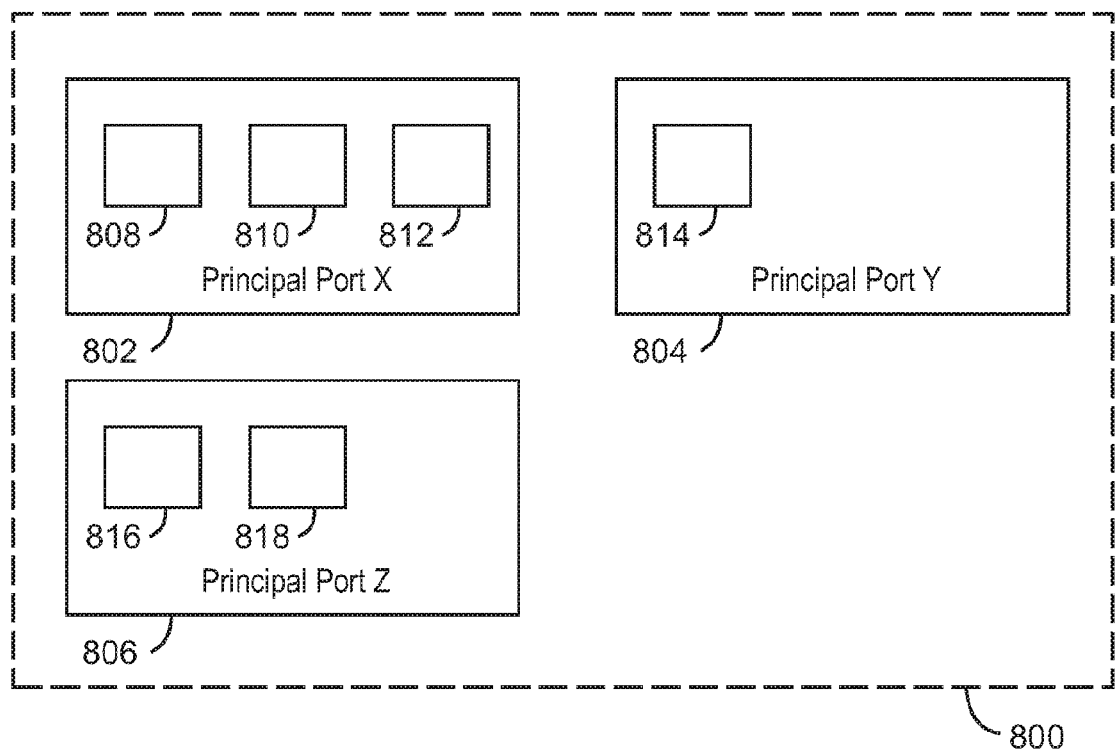
FIG. 8 is a schematic diagram of a target driven peer zoning database.

FIG. 8 is a schematic diagram of a target driven peer zoning database 800. The format shown here can be present in either a target or a switch with a TDPZ database 800.

A TDPZ database 800 can include multiple target-created peer zones each with the same principal port member. FIG. 8 shows principal port X 802, principal port Y 804, and principal port Z 806. In an example, principal port X 802 can include TDPZ zone A 808, TDPZ zone B 810, and TDPZ zone C 812. In an example, principal port Y 804 can include TDPZ zone D 806. In an example, principal port Z 804 includes TDPZ zone E 816 and TDPZ zone F 818.

When a GAPZL request is made by the target, the principal port WWN can be specified. In an example, if the GAPZL request can be made for principal port X 802, the GAPZL response can include a membership listing for each of the three TDPZ zones 808, 810, and 812 of principal port X 802. In an example, there may be just one versioning number for all TDPZ zones in a target, as each versioning number may be associated with a specific principal port WWN. In an example, if the GAPZL requests principal port Y 804, then the GAPZL response may include the membership of a single TDPZ zone, e.g. TDPZ zone 814, and the versioning number associated with principal port Y. In an example, the comparison of version numbers can occur in the target. The target can decide the most current database and takes appropriate action so that both databases contain the current information.

While the present techniques may be susceptible to various modifications and alternative forms, the examples discussed above have been shown by way of example. It may be understood that the techniques are not intended to be limited to the particular examples disclosed herein. Indeed, the present techniques include alternatives, modifications, and equivalents falling within the scope of the appended claims.

What is claimed is:

1. A system for target driven peer-zoning (TDPZ) synchronization, comprising:

a principal member device to send an active peer zone list request to a switch, wherein the principal member device stores a first TDPZ database version number and a first TDPZ zone list;
the principal member device to receive a response to the active peer zone list request, the response comprising a second TDPZ database version number and a second TDPZ zone list, the principal member device to compare the first TDPZ database version number to the second TDPZ database version number;
when the first TDPZ database version number is less than the second TDPZ database version number, the principal member device is to update the first TDPZ database version number to equal the second TDPZ database version number, and store the second TDPZ zone list in place of the first TDPZ zone list; and
when the first TDPZ database version number is greater than the second TDPZ database version number, the principal member device is to send an update to direct the switch to add/replace a peer zone or to remove a peer zone.

2. The system of claim 1, wherein the switch is to send a register state change notification (RSCN) to the principal member device, and the switch is to increment the second TDPZ database version number.

3. The system of claim 2, wherein the principal member device is to send an RSCN response to the switch, and the principal member device is to increment the first TDPZ database version number.

4. The system of claim 1, wherein the update comprises an add/replace active peer zone (AAPZ) command to direct the switch to add/replace a peer zone or a remove active peer zone (RAPZ) command to direct the switch to remove a peer zone.

5. The system of claim 4, wherein the principal member device is to increment the first TDPZ database version number when sending the AAPZ command or the RAPZ command.

6. The system of claim 1, wherein when the first TDPZ database version number is equal to the second TDPZ database version number, the system does not update either the principal member device or the switch.

7. A method for target driven peer-zoning (TDPZ) synchronization, comprising:
sending, with a principal member device to a switch, an active peer zone list request, wherein the principal member stores a first TDPZ database version and a first TDPZ zone list;
receiving, with the principal member device from the switch, a response based on the active peer zone list request, the response comprising a second TDPZ database version and a second TDPZ zone list;
comparing, at the principal member device, the first TDPZ database version number to the second TDPZ database version number; and
when the first TDPZ database version number is greater than the second TDPZ database version number, the principal member device sending an update to direct the switch to add/replace a peer zone or to remove a peer zone.

8. The method of claim 7, comprising:
sending, from the switch, a register state change notification (RSCN) to the principal member device; and
incrementing with the switch, the second TDPZ database version number.

9. The method of claim 7, the update comprising an add/replace active peer zone (AAPZ) command to direct the switch to add/replace a peer zone or a remove active peer zone (RAPZ) command to direct the switch to remove a peer zone.

10. The method of claim 9, comprising the principal member device incrementing the first TDPZ database version number when sending the AAPZ command or the RAPZ command.

11. The method of claim 7, comprising:
when the first TDPZ database version number is less than the second TDPZ database version number, the principal member device updating the first TDPZ database version number to equal the second TDPZ database version number, and the principal member device storing the second TDPZ zone list in place of the first TDPZ zone list.

12. The method of claim 7, comprising:
when the first TDPZ database version number is equal to the second TDPZ database version number, updating neither the principal member device nor the switch.

13. A non-transitory computer-readable medium comprising instructions executable by a processor to:
send, with a principal member device to a switch, an active peer zone list request, wherein the principal member stores a first TDPZ database version and a first TDPZ zone list;
receive, with the principal member device from the switch, a response based on the active peer zone list request, the response comprising a second TDPZ database version and a second TDPZ zone list;
compare, at the principal member device, the first TDPZ database version number to the second TDPZ database version number;
when the first TDPZ database version number is less than the second TDPZ database version number, with the principal member device, update the first TDPZ database version number to equal the second TDPZ database version number, and store the second TDPZ zone list in place of the first TDPZ zone list; and
when the first TDPZ database version number is greater than the second TDPZ database version number, the principal member device is to send an update to direct the switch to add/replace a peer zone or to remove a peer zone.

14. The non-transitory computer-readable medium of claim 13, wherein:
the update comprises an add/replace active peer zone (AAPZ) command to direct the switch to add/replace a peer zone or a remove active peer zone (RAPZ) command to direct the switch to remove a peer zone.

15. The non-transitory computer-readable medium of claim 14, comprising instructions to:
increment the first TDPZ database version number when sending the AAPZ command or the RAPZ command.

16. The non-transitory computer-readable medium of claim 13, wherein the instructions are to update neither the principal member device nor the switch when the first TDPZ database version number is equal to the second TDPZ database version number.

* * * * *